No. 791,220. PATENTED MAY 30, 1905.
F. L. SESSIONS.
MEANS FOR PROTECTING BOOSTER SETS.
APPLICATION FILED DEC. 18, 1899.
2 SHEETS—SHEET 1.
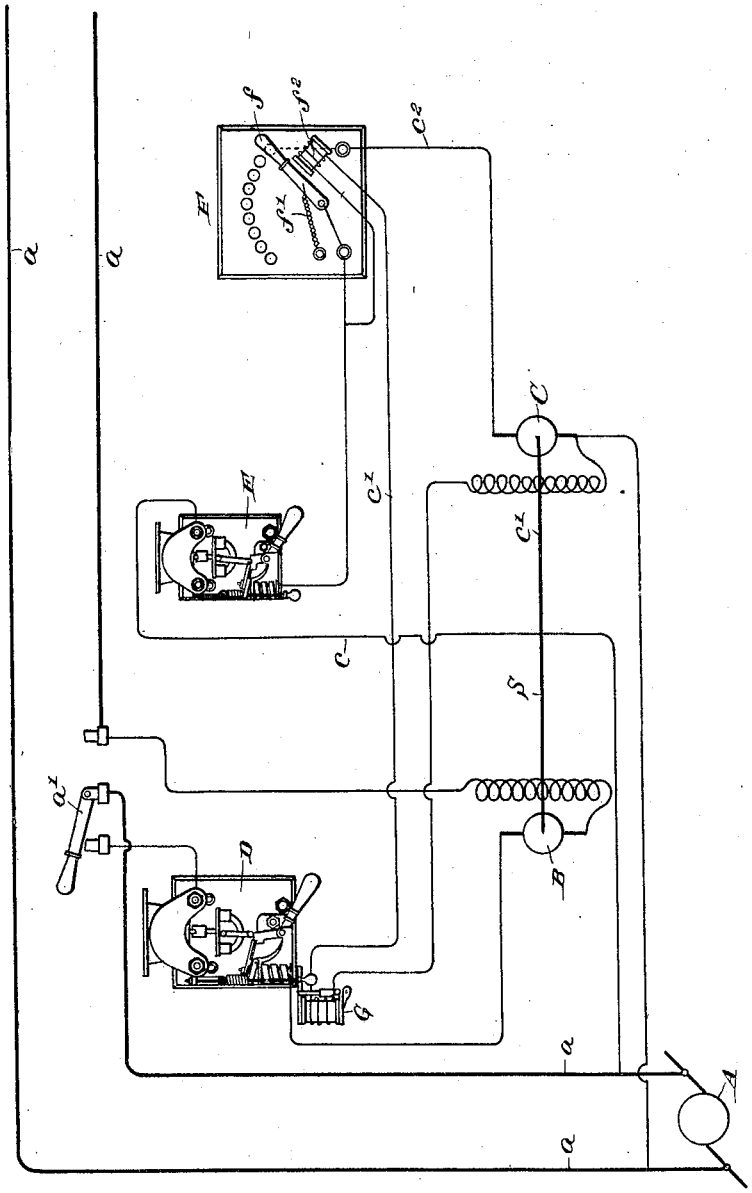

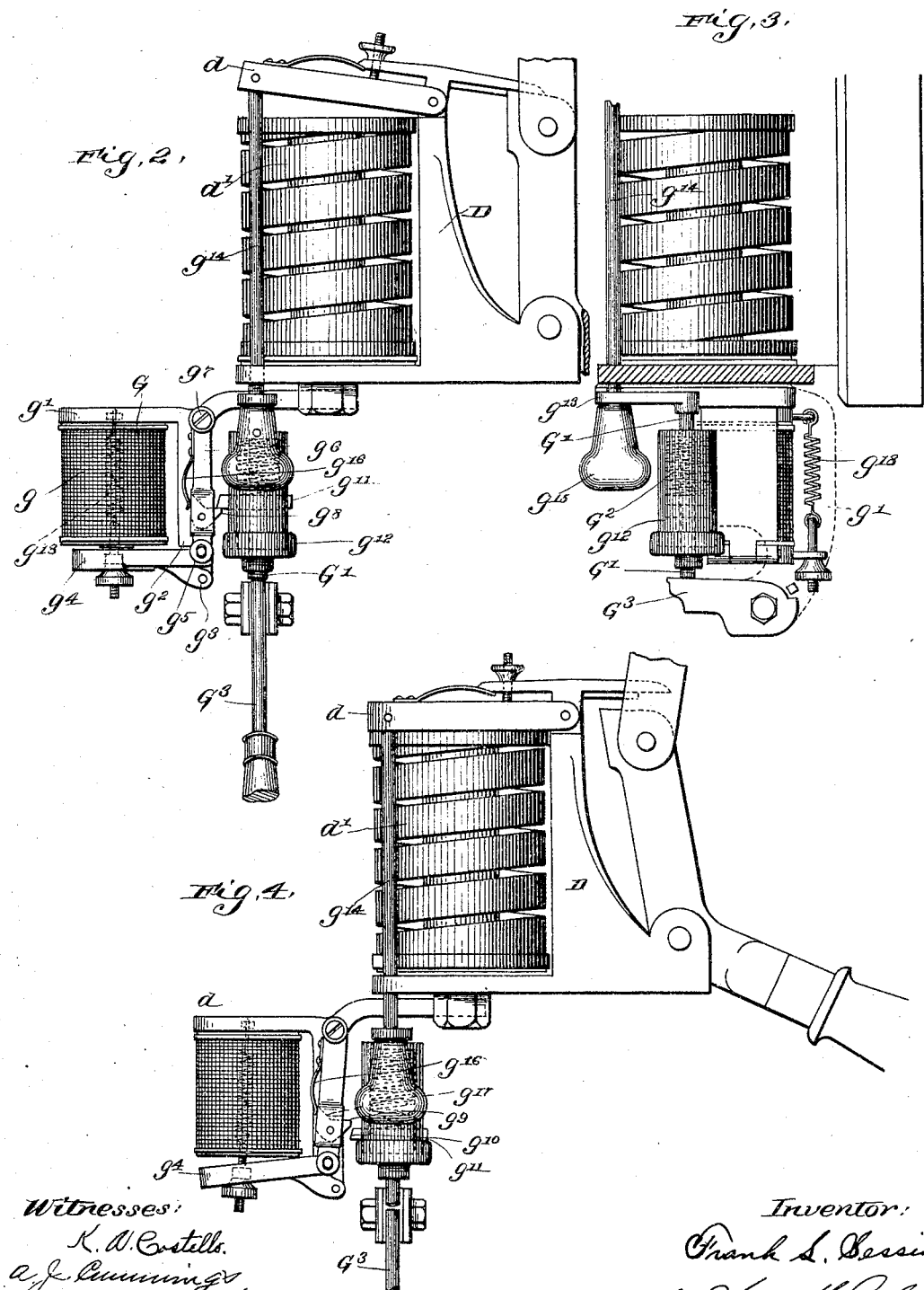

No. 791,220.

Patented May 30, 1905.

UNITED STATES PATENT OFFICE.

FRANK L. SESSIONS, OF OAK PARK, ILLINOIS, ASSIGNOR TO SIEMENS & HALSKE ELECTRIC COMPANY OF AMERICA, OF CHICAGO, ILLINOIS, A CORPORATION OF ILLINOIS.

MEANS FOR PROTECTING BOOSTER SETS.

SPECIFICATION forming part of Letters Patent No. 791,220, dated May 30, 1905.

Application filed December 18, 1899. Serial No. 740,692.

*To all whom it may concern:*

Be it known that I, FRANK L. SESSIONS, a citizen of the United States, residing at No. 306 Forest avenue, Oak Park, in the county of Cook and State of Illinois, have invented certain new and useful Improvements in Means for Protecting Booster Sets, of which the following is a specification.

This invention relates to improvements in means for protecting booster sets of that class comprising a generator connected in series in a circuit and a generator-actuating motor connected in shunt across the line, the purpose of the apparatus being to raise the electromotive force in the line to compensate for the transmission losses in cases where the amount of copper in the line is too small for the loads transmitted or where from any other cause such losses are large enough to be serious. In an apparatus of this character it is well understood that if the current through the motor should be interrupted the booster-generator would immediately begin to operate as a series motor, tending to rotate in a reverse direction from its rotation as a generator with a constantly accelerating speed up to the point where the friction and other losses become equal to the energy supplied, and long before this speed would be attained the entire apparatus would be likely to fly to pieces under the stress of the resultant centrifugal force.

The object of the present invention is to provide an improved controlling mechanism capable of so controlling the action of the apparatus as to insure its safety at all times and prevent any possible accident of the kind referred to, as will more fully appear from the following detailed description of the construction illustrated in the accompanying drawings, in which—

Figure 1 is a diagrammatic view of a booster set provided with the improved safety devices referred to. Fig. 2 shows a detailed side elevation of the safety-trip. Fig. 3 is a similar view in rear elevation. Fig. 4 is a view similar to Fig. 2, showing the trip as operated.

A designates a suitable generator supplying current to the leads $a$ of what may be called a "main circuit." B is the booster-generator, which is connected in series in said main circuit at any desired point for the purpose of increasing the electromotive force therein to compensate for the transmission losses, a double-throw switch $a'$ being herein shown as inserted in the main lead to permit the booster-generator to be cut in or out of the line, as desired.

C is the shunt-wound motor, which drives the booster-generator B by means of any suitable mechanical connection, said motor and generator being usually either mounted upon a common shaft S or mounted upon separate shafts coupled together to rotate in unison. The motor C is connected in a shunt-circuit $c$ across the line $a\ a$, and this shunt-circuit is subdivided, as usual, in the two parallel circuits $c'$ and $c^2$, which are, respectively, the shunt field and the armature circuits of the motor. A circuit-breaker D, inserted in the main line, is provided to cut out the booster-generator B in case of an abnormal rush of current in said line, and a second circuit-breaker E is provided in the circuit to the motor to cut out the latter in case the current through this circuit should increase to an undesirable extent. A starting-box F is also provided in the armature-circuit $c^2$ of the motor, its pivoted switch-lever $f$ being normally held closed against the tension of a spring $f'$ by an electromagnet $f^2$, that is connected in series in the shunt field-circuit $c'$ of the motor, so that unless a certain current is maintained through the field the starting-box will open and cut out the motor completely by interrupting both its armature and shunt field circuits. Such circuit-breakers and starting-boxes are familiar to those skilled in the art and need not, therefore, be more particularly described.

As thus far described the arrangement of apparatus involves no departure from the existing practice. As a further improvement in accordance with the present invention, however, an additional trip G is applied to the circuit-breaker D and operated by an electromagnet $g$, connected in series in the shunt field-circuit $c'$ of the motor. As better shown in Figs 2, 3, and 4, said tripping device comprises a framework $g'$, which is screwed or otherwise secured to the frame of the circuit-breaker D, the latter being of any suitable type and herein illustrated as the well-known G. E. instrument of that nature. The tripper-magnet $g$ is shown as depending beneath the frame $g'$, and the latter is provided with a depending arm $g^2$, carrying at its lower end a pivot $g^3$, which supports the usual vibratory armature $g^4$. The rear end of this armature is loosely connected at a point $g^5$ slightly above the pivot $g^3$ with the lower end of a vibratory arm $g^6$, that is pivoted at its upper end $g^7$ to the frame $g'$. Between its ends this arm $g^6$ is bifurcated to contain a pawl $g^8$, having a substantially horizontal rearwardly-projecting lip $g^9$, which is adapted to project beneath the adjacent shoulder $g^{10}$ on a vertical stem $G'$, so as to normally prevent any downward movement of said stem, said shoulder being herein shown as formed by the end of a transverse bar $g^{11}$, which is rigidly inserted in the stem. A spring $G^2$, inserted within a suitable housing or dash-pot $g^{12}$, provided on the frame $g'$ around the stem $G'$, tends to force the latter downwardly, except as withstood by said pawl $g^8$, and the pressure of the shoulder $g^{10}$ against said pawl, acting through the arm $g^6$ and connection $g^7$, tends to swing the armature $g^4$ down away from the magnet $g$ about its pivot $g^3$, which action of the armature will permit said arm $g^6$ to swing forward far enough on its pivot $g^7$ to carry the lip $g^9$ of the pawl out from under the shoulder $g^{10}$, whereupon the spring $G^2$ will expand and depress the stem $G'$. The upper end of this stem is rigidly connected by a cross-bracket $g^{13}$ and upwardly-extending rod $g^{14}$ with the tripping-armature $d$ of the circuit-breaker D, so that when said stem $G'$ is forced down in the manner described the circuit-breaker will be tripped to interrupt the current to the booster-generator in exactly the same manner as though the tripping-armature $d$ had been drawn down by an excess of current through the coil $d'$ of said circuit-breaker. The position of the parts at the moment the circuit-breaker is thus tripped is shown in Fig. 4. The construction of the tripping mechanism is such that although the spring $G^2$ is one of considerable strength the leverage which it will exert upon the armature $g^4$ will be very slight, so that said armature will normally be held up into contact with its magnet by the shunt-current through the field-circuit of the motor, which current traverses the coil $g$ of the tripping mechanism, owing to the connection of the latter in series in said field-circuit, as hereinbefore described. The interruption of the current through said shunt-field either by reason of the opening of the circuit-breaker E or of the starting-box F will then permit the armature $g^4$ to drop, with the effect of tripping the circuit-breaker D in the manner stated. Such dropping of the armature of course relieves it from the pressure of the spring $G^2$ and leaves it free to be again lifted by the attraction of its magnet when the shunt field-current of the motor is restored, whereupon the pawl $g^8$ will again project into the path of the shoulder $g^{10}$ ready to hold the stem $G'$ and circuit-breaker armature $d$ in their elevated position when again lifted. This latter action is accomplished manually in any suitable manner, as by means of the usual insulated knob $g^{15}$ on the lower end of the rod $g^{14}$ of the circuit-breaker or, if found necessary, by means of a suitable hand-lever $G^3$, which is herein shown as pivoted to the lower end of the tripper-frame $g'$ in position for contact with the lower end of said stem, Figs. 2, 3, and 4. To prevent the pawl $g^8$ from interfering with such lifting of the stem, it is shown as pivotally mounted within the arm $g^6$ and as held yieldingly in projected position by a spring $g^{16}$, suitable stop-surfaces $g^{17}$ being provided on the pawl and arm to correctly limit the projection of the pawl by the spring. A light adjusting-spring $g^{18}$ is also herein shown as applied between the tripper-frame $g'$ and armature $g^4$ to enable the movement of the armature to be more accurately controlled.

The tripping device thus described will be called into action to open the circuit-breaker D and cut out the booster-generator whenever the current through the shunt-field of the motor is interrupted in any manner—as, for example, by the opening of the circuit-breaker E and starting-box F—and if after both circuit-breakers are thus opened the operator or attendant should inadvertently close the circuit-breaker D without first closing the motor-circuit breaker and starting-box the former circuit-breaker would obviously open again as soon as the hand of the attendant had been lifted from it. As a consequence, therefore, the booster-generator will be cut out at all times except when its actuating-motor is energized, and the running away of said generator under such circumstances is obviously impossible.

It will be understood that various changes may be made in the details of the construction shown without involving any departure from the broad spirit of the invention claimed.

I claim as my invention—

1. As a means for protecting booster sets of that class comprising a generator connected in series in a main circuit and a generator-actuating motor connected in shunt across the line; a circuit-breaker interposed between the main line and the booster-generator, and an auxiliary trip applied to said circuit-breaker and controlled by an electromagnet connected in the shunt field-circuit of the motor, substantially as described.

2. The combination of a booster-generator in series relation to a circuit, a motor for acuating the same in shunt across the line, means responsive to predetermined increase or decrease of current in the motor-circuit, and a circuit-opening device in the booster-circuit governed thereby.

3. The combination with a booster-generator connected in series in a main circuit and a motor for actuating the generator connected in shunt across the line, of a circuit-breaker interposed between the main line and the booster-generator, and an underload and overload trip applied to said circuit-breaker and operating to open the latter whenever the current in the motor-circuit exceeds or falls below certain predetermined limits, substantially as described.

4. The combination with a booster-generator connected in series in a main circuit and a motor for actuating the generator connected in shunt across the line, of a circuit-breaker interposed between the main line and the booster-generator, an underload-trip applied to the circuit-breaker and operating to open the latter whenever the current in the motor-circuit falls below a predetermined limit, substantially as described.

5. The combination with a booster-generator connected in series in a main circuit and a motor for actuating the generator connected in shunt across the line, of a circuit-breaker interposed between the main line and the booster-generator, means for opening the motor-circuit whenever the current therein exceeds a predetermined limit, and means controlled by an electromagnet connected in the motor-circuit for operating said circuit-breaker whenever the motor-circuit is open, substantially as described.

6. The combination with a booster-generator connected in series in a main circuit and a motor for actuating the generator connected in shunt across the line, of a circuit-breaker interposed between the main line and the booster-generator, means for opening the motor-circuit whenever the current therein falls below a predetermined limit, and means controlled by an electromagnet connected in the motor-circuit for operating said circuit-breaker whenever the motor-circuit is open, substantially as described.

7. The combination with a booster-generator connected in series in a main circuit and a motor for actuating the generator connected in shunt across the line, of a circuit-breaker interposed between the main line and the booster-generator, means for opening the motor-circuit whenever the current therein exceeds a predetermined limit, means for opening the motor-circuit whenever the current therein falls below a predetermined limit, and means controlled by an electromagnet connected in the motor-circuit for operating said circuit-breaker whenever the motor-circuit is open, substantially as described.

8. As a means for protecting booster sets of that class comprising a generator connected in series in a main circuit and a generator-actuating motor connected in shunt across the line; a circuit-breaker interposed between the main line and the booster-generator, a second circuit-breaker connected in the circuit to the motor, and an auxiliary trip applied to the first circuit-breaker and controlled by an electromagnet connected in the shunt field-circuit of the motor, substantially as described.

9. As a means for protecting booster sets of that class comprising a generator connected in series in a main circuit and a generator-actuating motor connected in shunt across the line; a circuit-breaker interposed between the main line and the booster-generator, a second circuit-breaker connected in the circuit to the motor, an auxiliary trip applied to the first circuit-breaker and controlled by an electromagnet connected in the shunt field-circuit of the motor, substantially as described.

10. As a means for protecting booster sets of that class comprising a generator connected in series in a main circuit and a generator-actuating motor connected in shunt across the line; a circuit-breaker interposed between the main line and the booster-generator, a starting-box connected in the circuit to the motor and arranged to be held closed against the tension of an opening-spring by an electromagnet connected in the shunt field-circuit of the motor, and an auxiliary trip applied to the circuit-breaker and controlled by an electromagnet connected in the shunt field-circuit of the motor, substantially as described.

11. As a means for protecting booster sets of that class comprising a generator connected in series in a main circuit and a generator-actuating motor connected in shunt across the line; a circuit-breaker interposed between the main line and the booster-generator, a second circuit-breaker connected in the circuit to the motor, a starting-box connected in the circuit to the motor and arranged to be held closed against a tension of an opening-spring by an electromagnet connected in the shunt field-circuit of the motor, and an auxiliary trip applied to the first circuit-breaker and controlled by an electromagnet connected in the shunt field-circuit of the motor, substantially as described.

In testimony that I claim the foregoing as my invention I affix my signature, in presence of two subscribing witnesses, this 8th day of December, A. D. 1899.

FRANK L. SESSIONS.

Witnesses:
HENRY W. CARTER,
ALBERT H. GRAVES.